No. 727,577.

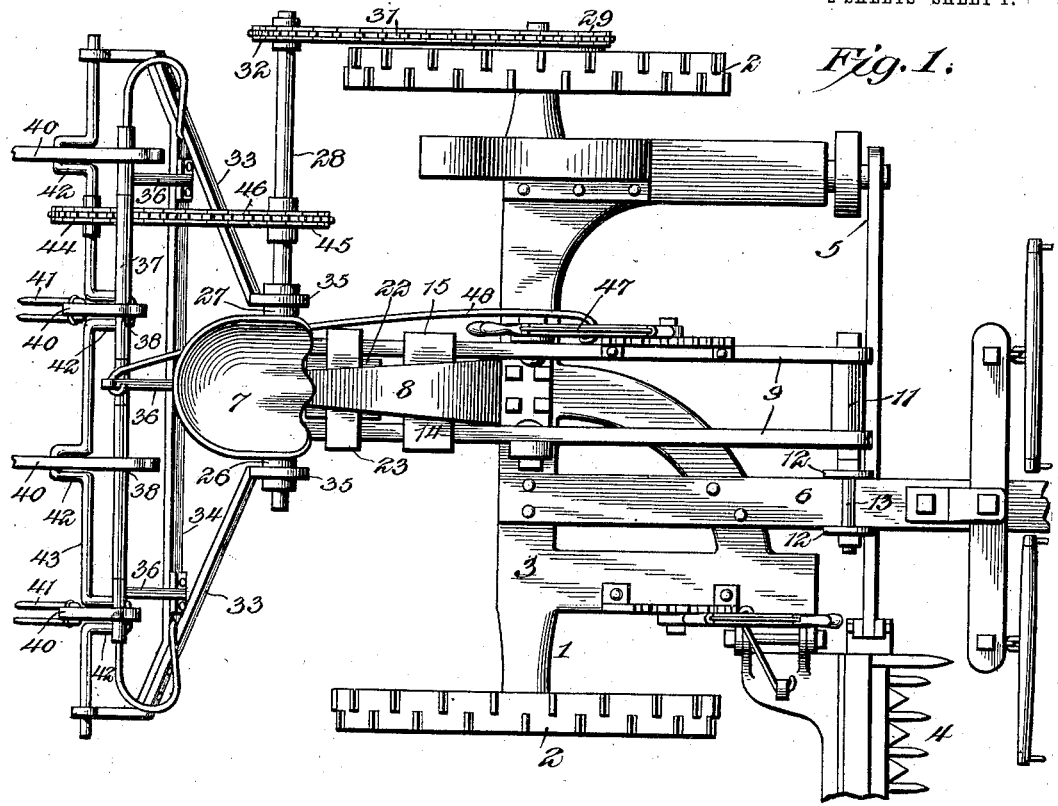

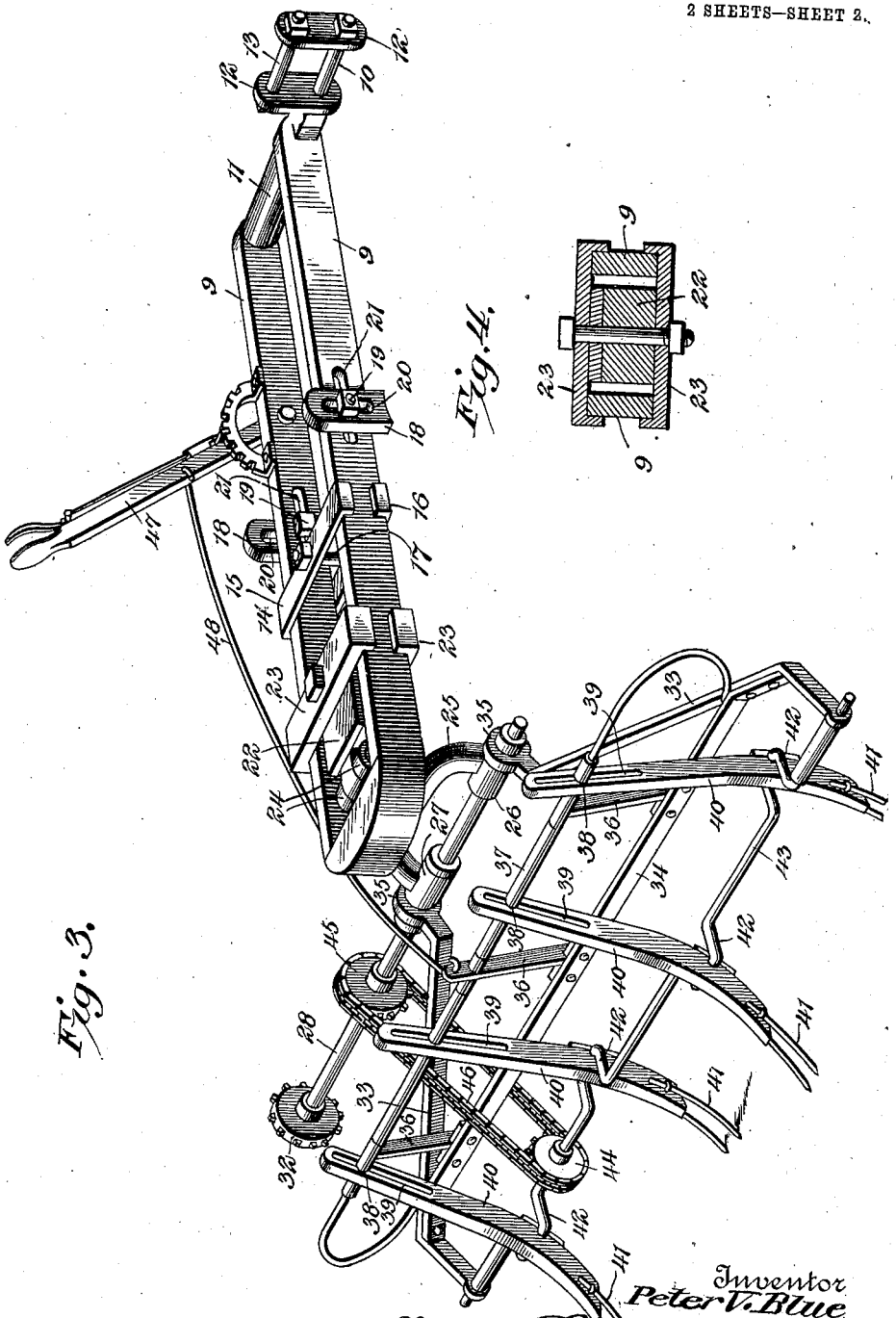

Patented May 12, 1903.

UNITED STATES PATENT OFFICE.

PETER V. BLUE, OF THACKERY, OHIO, ASSIGNOR TO ADAM NEER, OF ST. PARIS, OHIO.

HAY-TEDDER ATTACHMENT.

SPECIFICATION forming part of Letters Patent No. 727,577, dated May 12, 1903.

Application filed April 30, 1902. Serial No. 105,339. (No model.)

*To all whom it may concern:*

Be it known that I, PETER V. BLUE, a citizen of the United States, residing at Thackery, in the county of Champaign and State of Ohio, have invented a new and useful Hay-Tedder Attachment, of which the following is a specification.

This invention relates to a novel hay-tedder attachment for mowing-machines, the object being to provide a tedder arranged for attachment to various types of mowing-machines and disposed when so attached to perform the function of a tedder without interfering with the operation of the mower and to equalize the side draft occasioned by the location of the cutter-bar beyond one side of the machine.

A further object of the invention is to arrange the tedder for control by the driver and to mount the fork handles or bars in a manner to economize the power necessary for their operation.

Subordinate objects of the invention and other novel features of construction will appear during the course of the succeeding description of the illustrated embodiment of the invention.

In the accompanying drawings, Figure 1 is a plan view of a mower with my attachment applied as in use. Fig. 2 is a longitudinal sectional view through the subject-matter of Fig. 1. Fig. 3 is a detail perspective view, on an enlarged scale, of the complete tedder attachment; and Fig. 4 is a detail sectional view on the line 4 4 of Fig. 2.

Like numerals of reference are employed to designate corresponding parts throughout the several views.

The attachment is shown applied to an ordinary form of mower comprising the axle 1, the carrying-wheels 2, the frame 3, supported by the axle, the cutter-bar 4, extending to one side of the machine, the usual operating mechanism 5 for the cutter-bar, the tongue 6, extended forwardly from the frame, and the driver's seat 7, supported by the seat-spring 8, bolted or otherwise secured to the frame 3 or to the axle. It should be understood, however, that the illustrated type of mower is shown only for the purpose of disclosing the manner of attachment of the teddering appliance, as one of the primary features of the attachment is its applicability to mowers of various types.

The main support of the attachment comprises what may be termed a "double" beam 9, supported by the frame or axle, as the case may be, and straddling the seat-spring 8. This double beam 9 is preferably formed from a single length of metal having an elongated U shape, its front ends being connected by a transverse bolt 10, passed through the ends of the beam and through a spacing-sleeve 11 and provided to one side of the beam with means of attachment to the tongue 6. Such means are preferably in the form of a pair of clamping members or plates 12, carried by the bolt 10, extending under the tongue and connected above the tongue by a draw-bolt 13. By means of this clamp the front end of the beam 9, extended a suitable distance in advance of the axle, may be rigidly secured to the tongue without in any way altering the construction of the mower.

The seat-spring 8, straddled by the beam 9, as stated, serves to retain the rear end of the beam against lateral movement and also holds the beam down upon the frame by reason of the fact that the beam is provided in rear of the spring 8 with an adjustable clamp 14, which is moved up against the back of the rearwardly-inclined spring and rigidly secured in place. The construction of the clamp 14, which constitutes retaining means coöperating with the seat-spring, may be varied within wide limits, but preferably comprises a pair of plates 15 and 16, imposed against the top and bottom of the beam and drawn into engagement therewith by a draw-bolt 17. The beam is further retained and slight vertical adjustment thereof made possible by a pair of vertically-disposed rests 18 resting upon the axle and secured to the opposite side bars of the beam by bolts 19, passed through vertical slots 20 in the rests and through horizontal slots 21 in the beam. The provision of the slots 20 and 21 facilitates the adjustment of these rests to accommodate them to various mower constructions.

Within the beam, adjacent to its rear end, is mounted a supporting-block 22, adjustable lengthwise of the beam and retained in place by clamping members 23. At its rear end the block 22 has a hinged connection with a pair of ears 24, upstanding from the center of a supporting-arch 25, provided at its ends with bearing-sleeves 26 and 27 for the reception of the driving-shaft 28 of the tedder attachment. Any suitable operating means for driving this shaft may be provided; but since it is designed to operate the tedder by the traction of the mower I prefer to provide a sprocket-wheel 29, detachably secured to one of the carrying-wheels, as by clamps 30, and geared by a sprocket-chain 31 to the sprocket-wheel 32, keyed upon one end of the shaft 28. The supporting-arch 25 is also designed to support the swinging tedder-frame comprising the rearwardly-diverging side bars 33, connected by a transverse brace-bar 34 and provided at their front or inner ends with collars 35, encircling the bearing-sleeves 26 and 27 of the supporting-arch. The tedder-frame also comprehends a series of posts 36, upstanding from the brace-bar 34 and supporting at their upper ends a guide-bar 37, provided at intervals with reduced portions 38. These reduced portions 38 of the guide-bar 37 are designed for reception within elongated slots 39 in the fork-handles 40, at the lower ends of which are mounted tedder-forks 41, as usual. At points sufficiently below the guide-bar 37 the fork-handles are attached to the cranks 42 of the crank-shaft 43, which latter is journaled at its opposite ends in suitable bearings formed in the rearwardly-extending parallel ends of the frame-bars 33. The crank-shaft 43 is geared to the driving-shaft 28, as by sprockets 44 and 45, carried by the shafts, and an intermediate sprocket-chain 46.

For the purpose of elevating the tedder-frame to move the forks to an inoperative position an operating-lever 47 is mounted at one side of the beam 9 in advance of the driver's seat and is connected, by means of a rod 48, with one of the posts 36, the lever being provided with the usual spring-latch for retaining it in its adjusted positions.

It is obvious that when the tedder is attached to a mower it is disposed in rear thereof and entirely out of the way of the operating parts of the machine, and, further, that the arrangement of the tedder is such that the side draft induced by the cutter-bar will be counteracted in more or less degree.

The operation of the device is as follows: Assuming that the supporting-beam has been rigidly secured to the mower-frame by the proper adjustment of the clamps 12 and 14 and the rests 18, the supporting-block is properly located lengthwise of the beam to dispose the tedder-frame at the proper distance in rear of the machine. The gearing is then properly arranged and the attachment will be ready for operation. The advance movement of the mower will operate the rock-shaft 43 in an obvious manner, and the fork-handles will be given a combined swinging and reciprocatory movement to effectually spread the hay, the power required for the operation of the tedder being reduced to a minimum by the peculiar mounting of the fork-handles. If it should be desired to elevate the tedder-frame, either for the purpose of putting the tedder out of operation or to clear an obstruction, the lever 47 is thrown forward by the operator to swing the frame upwardly, where it will be retained by the lever-latch in an obvious manner.

It is thought that from the foregoing the construction and operation, as well as the mode of attachment of my invention, will be clearly apparent; but while the illustrated embodiment of said invention is thought at this time to be preferable I wish to be understood as reserving the right to effect such changes, modifications, and variations of the illustrated structure as may be properly comprehended within the scope of the protection prayed.

What I claim is—

1. A tedder attachment for mowers, comprising a supporting-beam, a clamp carried at the front end of the beam for attachment to the mower-tongue, a supporting-arch carried by the opposite end of the beam, a driving-shaft journaled in said arch, a tedder-frame supported from the arch, tedder-forks carried by the frame, and means for operatively connecting the driving-shaft with the tedder-forks to operate the same.

2. In a tedder attachment for mowers, the combination with a supporting-beam having means of attachment to the mower-frame, of a supporting-arch at the rear end of the beam, a driving-shaft journaled in the arch, a tedder-frame swung from said arch, a crank-shaft mounted in the tedder-frame, tedder-forks operatively connected to the crank-shaft, and gearing operatively connecting the driving-shaft with the crank-shaft.

3. In a tedder attachment for mowers, the combination with a supporting-beam having means of attachment to the mower-frame, of a supporting-arch adjustably mounted at the rear end of the beam, a swinging tedder-frame carried by the arch, tedder-forks carried by the frame, means for operating the forks, and means for raising and lowering the tedder-frame.

4. In a tedder attachment for mowers, the combination with a supporting-beam having means of attachment to the mower-frame, of a transversely-disposed supporting-arch adjustable lengthwise of the beam, a tedder-frame swung from the arch, means for adjusting the frame, tedder-forks carried by the frame, and means for operating the forks.

5. In a tedder attachment for mowers, the combination with a supporting-beam having means of attachment to the mower-frame, of a transversely-disposed supporting-arch adjustable lengthwise of the beam, a driving-shaft journaled in the arch, a tedder-frame swung from the arch and disposed in rear thereof, means for raising and lowering the tedder-frame, tedder-forks carried by the frame, and means for operating the forks.

6. In a tedder attachment for mowers, the combination with a supporting-beam, of a supporting-block adjustable upon the beam, a supporting-arch swung from the block, a driving-shaft journaled in the arch, a tedder-frame swung from the arch and disposed in rear thereof, tedder-forks carried by the tedder-frame, and means for operatively connecting said forks with the driving-shaft.

7. In a tedder attachment for mowers, the combination with a supporting-beam, of an adjustable supporting-block carried by the beam, a supporting-arch swung from the block, a tedder-frame swung from the arch and disposed in rear thereof, said frame including a guide-bar, a crank-shaft journaled in the tedder-frame below the guide-bar, fork-handles connected to the cranks of the crank-shaft and having sliding engagement with the guide-bar, forks carried by the handles, a driving-shaft journaled in the supporting-arch, and gearing connecting the driving-shaft and the crank-shaft.

8. The combination with a mower having a seat-spring, of a double beam straddling said spring and retained thereby against lateral displacement, means for attaching the beam to the mower-frame, a tedder-frame carried by the beam, tedder-forks carried by the tedder-frame, and means for operating the forks.

9. In a tedder attachment for mowers, the combination with a double beam arranged to straddle the seat-spring of a mower, of a clamp carried by the beam at one side thereof for attachment to the mower-tongue, a retaining device carried by the beam and disposed to engage the seat-spring, a tedder-frame located at the rear end of the beam, tedder-forks carried by the frame, and means for operating the forks.

10. In a tedder attachment for mowers, the combination with a supporting-beam, of a clamping device located at the front end thereof for attachment to a mower-tongue, adjustable rests carried by the beam at a point intermediate of its ends, a tedder-frame located at the rear end of the beam, tedder-forks carried by the frame, and means for operating the forks.

11. In a tedder attachment for mowers, the combination with a double supporting-beam designed to straddle the seat-spring of a mower, of a clamp disposed to one side of the front end of the beam for attachment to the mower-tongue, adjustable rests secured to the opposite sides of the beam intermediate of the ends thereof, an adjustable retaining device carried by the beam and disposed to engage the seat-spring, a tedder-frame swung from the rear end of the supporting-beam, means for raising and lowering the frame, tedder-forks carried by the frame, and means for operating the forks.

12. In a tedder attachment for mowers, the combination with a double supporting-beam designed to straddle the seat-spring of a mower, of a clamp located at the front end of the beam to engage the mower-tongue, adjustable rests carried by the beam intermediate of the ends thereof, a retaining device carried by the beam for engagement with the seat-spring, a supporting-arch disposed under the rear end of the beam, a tedder-frame swung from the arch and provided with forks, a driving-shaft journaled in the supporting-arch, means for operating the forks from the driving-shaft, and means for connecting the driving-shaft with a carrying-wheel of the mower.

13. The combination with a mower including a frame, a tongue extending forwardly therefrom and a seat-spring, of a tedder attachment comprising a beam clamped at its front end to the tongue, other retaining means connecting the beam to the mower-frame by engaging the seat-spring, a tedder-frame swung from the rear end of the beam, tedder-forks mounted in the frame, and means for operating the forks.

14. The combination with a mower including a frame, a tongue and a seat-spring, of a tedder attachment comprising a double beam straddling the seat-spring retained thereby against lateral displacement, a clamp extending from one side of the front end of the beam and attached to the tongue of the mower, a tedder-frame swung from the rear end of the beam, tedder-forks mounted in the frame, and means for operating the forks.

15. In a tedder attachment for mowers, the combination with a supporting-beam, of an adjustable block carried by the beam, an arch supported by the block, a tedder-frame swung from the arch, tedder-forks carried by the frame, and means for operating the forks.

16. A tedder attachment for mowers, comprising a supporting-beam, a clamp carried at the front end of the beam for attachment to the mower-tongue, a swinging arch carried by the opposite end of the beam, a driving-shaft journaled in said arch, a tedder-frame supported from the arch, tedder-forks carried by the frame, and means for operatively connecting the driving-shaft with the tedder-forks to operate the same.

In testimony that I claim the foregoing as my own I have hereto affixed my signature in the presence of two witnesses.

PETER V. BLUE.

Witnesses:
W. H. GRAFTON,
A. M. GRAFTON.